(12) United States Patent
Jang

(10) Patent No.: US 11,017,264 B2
(45) Date of Patent: May 25, 2021

(54) METHOD AND APPARATUS WITH DILATED CONVOLUTION

(71) Applicant: Samsung Electronics Co., Ltd., Suwon-si (KR)

(72) Inventor: Junwoo Jang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 16/393,107

(22) Filed: Apr. 24, 2019

(65) Prior Publication Data

US 2020/0175313 A1 Jun. 4, 2020

(30) Foreign Application Priority Data

Dec. 3, 2018 (KR) .......................... 10-2018-0153723

(51) Int. Cl.
*G06K 9/62* (2006.01)
*G06K 9/66* (2006.01)
*G06N 3/08* (2006.01)

(52) U.S. Cl.
CPC ........... *G06K 9/6202* (2013.01); *G06K 9/627* (2013.01); *G06K 9/6232* (2013.01); *G06K 9/66* (2013.01); *G06N 3/08* (2013.01)

(58) Field of Classification Search
CPC .................................................. G06K 9/6202
See application file for complete search history.

(56) References Cited

U.S. PATENT DOCUMENTS

| 9,953,236 | B1 | 4/2018 | Huang et al. |
| 2013/0223763 | A1* | 8/2013 | Lin .......................... G06K 9/32 382/294 |
| 2018/0150740 | A1 | 5/2018 | Wang et al. |
| 2018/0181857 | A1 | 6/2018 | Mathew et al. |
| 2018/0336462 | A1 | 11/2018 | Brothers |
| 2018/0341872 | A1* | 11/2018 | Wang ........................ G06T 7/11 |
| 2019/0138898 | A1 | 5/2019 | Song et al. |
| 2020/0251183 | A1* | 8/2020 | Kashefhaghighi ..... G16B 20/20 |

FOREIGN PATENT DOCUMENTS

| JP | 2017-45341 A | 3/2017 |
| KR | 10-2018-0062422 A | 6/2018 |
| KR | 10-2018-0125884 A | 11/2018 |
| KR | 10-2019-0051697 A | 5/2019 |

OTHER PUBLICATIONS

Hamaguchi et al (NPL "Effective Use of Dilated Convolution for Segmenting Small Object Instances in Remote Sensing Imagery", p. 10, 2017) (Year: 2017).*
Yu etal (NPL "Multi-Scale Context Aggregation by Dilated Convolutions", p. 13, p. 2016). (Year: 2016).*

* cited by examiner

*Primary Examiner* — Oneal R Mistry
(74) *Attorney, Agent, or Firm* — NSIP Law

(57) ABSTRACT

A neural network apparatus includes one or more processors configured to acquire an input feature map and trained weights, generate a plurality of sub-feature maps by splitting the input feature map based on a dilation rate, generate a plurality of intermediate feature maps by performing a convolution operation between the plurality of sub-feature maps and the trained weights, and generate a dilated output feature map by merging the plurality of intermediate feature maps based on the dilation rate.

19 Claims, 10 Drawing Sheets

FIG. 8A

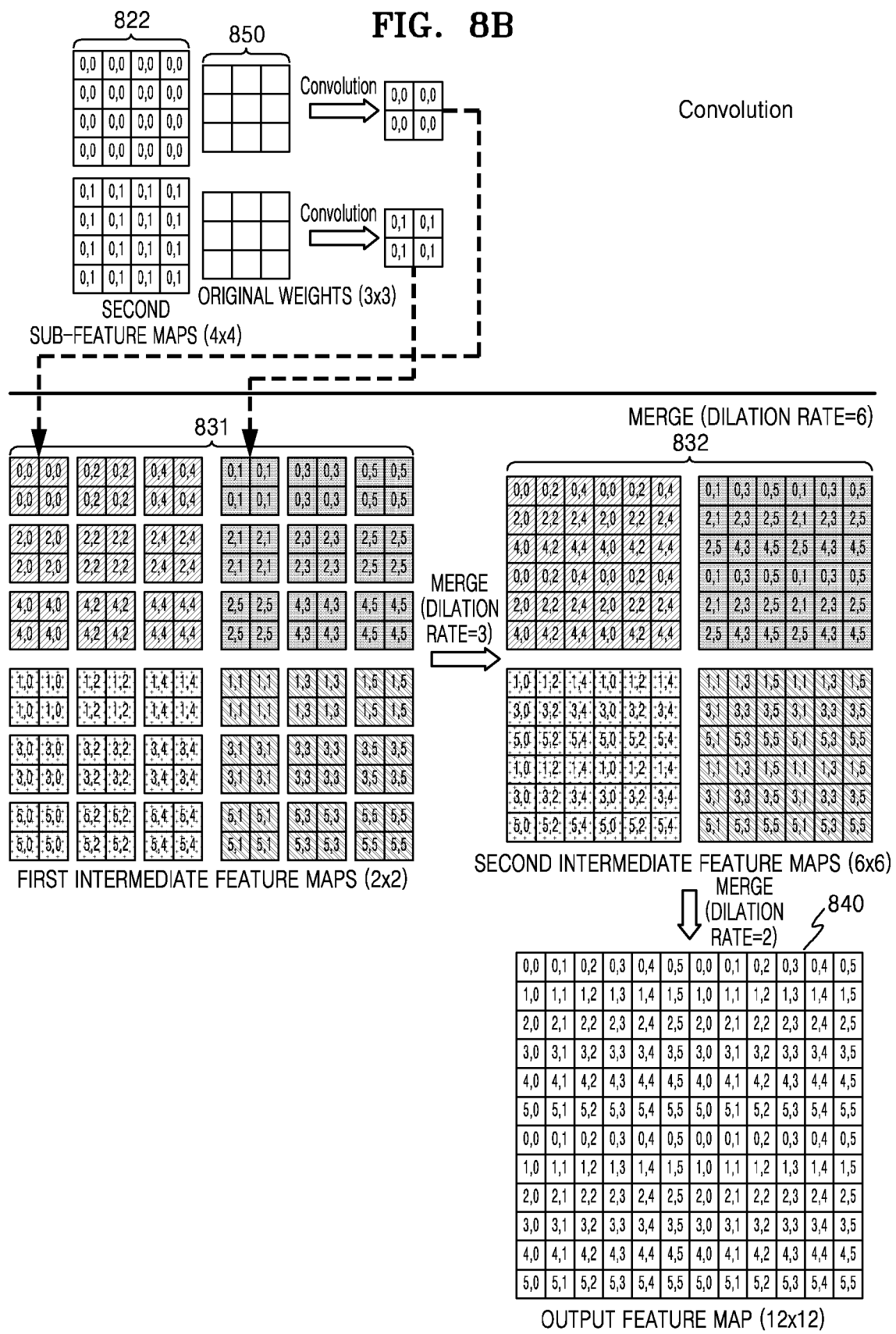

METHOD AND APPARATUS WITH DILATED CONVOLUTION

CROSS-REFERENCE TO RELATED APPLICATION

This application claims the benefit of Korean Patent Application No. 10-2018-0153723, filed on Dec. 3, 2018, in the Korean Intellectual Property Office, the disclosure of which is incorporated herein in its entirety by reference.

BACKGROUND

1. Field

The present disclosure relates to a method and apparatus with dilated convolution.

2. Description of the Related Art

Along with the development of neural network technology, various kinds of electronic systems use a neural network to analyze input data to extract valid data.

Typical low-power apparatuses for processing a neural network, such as a low-power hardware accelerator or processor implementing a deep neural network (DNN), require a large amount of computations for complex input data.

Particularly, typical neural network devices implemented with low power and low performance cannot efficiently process operations needed to analyze a large amount of input data in real time to extract desired information by using the neural network.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a neural network apparatus includes one or more processors configured to acquire an input feature map and trained weights, generate a plurality of sub-feature maps by splitting the input feature map based on a dilation rate, generate a plurality of intermediate feature maps by performing a convolution operation between the plurality of sub-feature maps and the trained weights, and generate a dilated output feature map by merging the plurality of intermediate feature maps based on the dilation rate.

Neighboring pixels of each of the plurality of sub-feature maps may be pixels differently spaced, with respect to the input feature map, by a number resulting from subtracting 1 from the dilation rate.

Each of the plurality of sub-feature maps may include pixels from the input feature map separated in the input feature map according to the dilation rate.

For the generating of the sub-feature maps, the one or more processors may be configured to: compare a size of each of the plurality of sub-feature maps with a predetermined size, and in response to a size of at least one sub-feature map of the plurality of sub-feature maps being smaller than the predetermined size, pad at least one part of edges of the at least one sub-feature map with a predetermined value such that the size of the at least one sub-feature map becomes the predetermined size.

For the padding of the at least one part of edges of the at least one sub-feature map, the one or more processors may be configured to add either one or both of a row or column of pixels of the predetermined value to the at least one sub-feature map.

Neighboring pixels of each of the plurality of intermediate feature maps may be pixels spaced by a number resulting from subtracting 1 from the dilation rate in the output feature map.

The one or more processors may include: a splitter configured to perform the splitting of the input feature map into the plurality of sub-feature maps based on the dilation rate, and a merger configured to perform the merging of the plurality of intermediate feature maps based on the dilation rate to generate the output feature map.

For the generating of the sub-feature maps, the one or more processors may be configured to: compare the dilation rate with a threshold value, and in response to the dilation rate exceeding the threshold value, update the dilation rate by dividing the dilation rate by a predetermined value, and split the input feature map into the plurality of sub-feature maps based on the predetermined value.

The sub-feature maps may be first sub-feature maps, and the one or more processors may be configured to: compare the updated dilation rate with the threshold value, and in response to the updated dilation rate exceeding the threshold value, update the updated dilation rate by dividing the updated dilation rate by the predetermined value, and split the plurality of first sub-feature maps into a plurality of second-sub feature maps based on the predetermined value.

For the generating of the sub-feature maps, the one or more processors may be configured to: compare the dilation rate with a threshold value, and in response to the dilation rate exceeding the threshold value, update the dilation rate by dividing the dilation rate by a predetermined value, and merge the plurality of intermediate feature maps based on the predetermined value to generate the output feature map.

The one or more processors may include a convolution operator configured to perform the convolution operation between the plurality of sub-feature maps and the trained weights.

The one or more processors may be configured to acquire a dilated weight from a memory and restore the dilated weight to the trained weights based on the dilation rate.

The input feature map may correspond to an input image, and the one or more processors may be configured to perform an image recognition for the input image based on the output feature map.

In another general aspect, a processor-implemented neural network method includes: acquiring an input feature map and trained weights; generate a plurality of sub-feature maps by splitting the input feature map based on a dilation rate; generate a plurality of intermediate feature maps by performing a convolution operation between the plurality of sub-feature maps and the trained weights; and generate a dilated output feature map by merging the plurality of intermediate feature maps based on the dilation rate.

Neighboring pixels of each of the plurality of sub-feature maps may be pixels spaced by a number resulting from subtracting 1 from the dilation rate in the input feature map.

The generating of the plurality of sub-feature maps may include: comparing a size of each of the plurality of sub-feature maps with a predetermined size; and in response to a size of at least one sub-feature map of the plurality of sub-feature maps being smaller than the predetermined size, padding at least one part of edges of the at least one sub-feature map with a predetermined value such that the size of the at least one sub-feature map becomes the predetermined size.

Neighboring pixels of each of the plurality of intermediate feature maps may be pixels spaced by a number resulting from subtracting 1 from the dilation rate in the output feature map.

The generating of the plurality of sub-feature maps may include: comparing the dilation rate with a threshold value; and in response to the dilation rate exceeding the threshold value, updating the dilation rate by dividing the dilation rate by a predetermined value, and splitting the input feature map into the plurality of sub-feature maps based on the predetermined value.

The generating of the plurality of sub-feature maps may include: comparing the dilation rate with a threshold value, and in response to the dilation rate exceeding the threshold value, updating the dilation rate by dividing the dilation rate by a predetermined value, and merging the plurality of intermediate feature maps based on the predetermined value to generate the output feature map.

The acquiring of the input feature map and the trained weights may include: acquiring the input feature map and a dilated weight from a memory; restoring the dilated weight to the trained weights based on the dilation rate.

A non-transitory computer-readable storage medium may store instructions that, when executed by one or more processors, cause the one or more processors to perform the method.

Other features and aspects will be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which:

FIGS. 8A and 8B illustrate methods of performing dilated convolution operations considering computation performance of a splitter and a merger, according to one or more embodiments of the disclosure;

DETAILED DESCRIPTION

Figure 1:
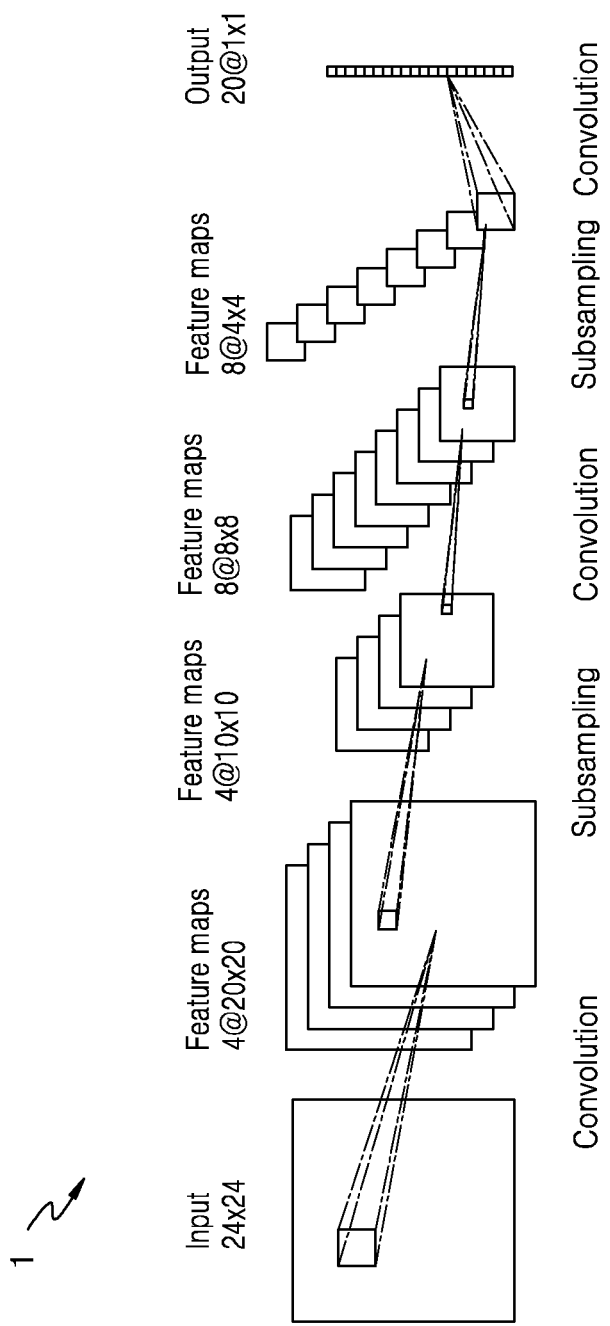
FIG. 1 illustrates an architecture of a neural network according to one or more embodiments of the disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way.

As used herein, the term "and/or" includes any one and any combination of any two or more of the associated listed items.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

In this specification, the phrases "some embodiments", "an embodiment", etc. may not indicate the same embodiment.

Some embodiments of the disclosure may be represented by functional blocks and various processing operations. The entire or a part of the functional blocks may be realized by a plurality of hardware and/or software configurations that execute specific functions. For example, the functional blocks of the disclosure may be implemented by one or more microprocessors or circuit configurations for predetermined functions. Also, for example, the functional blocks of the disclosure may be implemented with various programming or scripting languages. The functional blocks may be implemented as algorithms that are executed on one or more processors. Also, the disclosure may adopt typical techniques for electronic environment settings, signal processing, and/or data processing. The terms "mechanism", "factor", "means", "configuration", etc. may be used in a broad sense, and are not limited to mechanical, physical configurations.

Also, connections between lines of components shown in the drawings or connection members of the lines exemplarily indicate functional connections and/or physical connections or circuit connections. The connections may be replaced or may be indicated as additional various functional connections, physical connections, or circuit connections in a real apparatus.

Also, in the description of example embodiments, detailed description of structures or functions that are thereby known after an understanding of the disclosure of the present application will be omitted when it is deemed that such description will cause ambiguous interpretation of the example embodiments.

FIG. 1 illustrates an architecture of a neural network according to one or more embodiments of the disclosure.

Referring to FIG. 1, a neural network 1 may be an architecture of a Deep Neural Network (DNN) or n-layer neural networks. The DNN or the n-layer neural networks may correspond to Convolutional Neural Networks (CNNs), Recurrent Neural Networks (RNNs), Deep Belief Networks (DBNs), Restricted Boltzmann Machines (RBMs), or the like. For example, the neural network 1 may be a CNN, although not limited thereto. In FIG. 1, a CNN corresponding to an example of the neural network 1 may further include a sub-sampling layer (or called a pooling layer), a fully connected layer, etc., in addition to a convolution layer.

For example, in the present disclosure, apparatuses may be described as implementing CNNs, e.g., based on convolutions using previously trained (hereinafter "original") parameters and/or convolutions or convolution operations that are selectively performed based on such previously trained parameters, though embodiments are not limited to such apparatuses only performing such convolutional and/or selective convolutional operations, but rather embodiments also include such apparatuses also being configured to train the CNN, as well as use the trained CNN and/or selectively implemented CNN in an example, filtering, detection, recognition, rejection, verification, classification, or other such 'interpretative' operations or objectives the respective layers or overall CNN are trained to perform. Herein, it is also noted that use of the term 'may' with respect to an example or embodiment, e.g., as to what an example or embodiment may include or implement, means that at least one example or embodiment exists where such a feature is included or implemented while all examples and embodiments are not limited thereto.

Referring to FIG. 1, a neural network apparatus may acquire such trained parameters corresponding to one or more layers included in a neural network, e.g., the herein discussed example CNN type of neural network, noting that embodiments are not limited thereto. For example, the neural network apparatus may acquire parameters, e.g., as determined by the neural network apparatus during example training of the neural network by the neural network apparatus, from memory, or through external request or provision. Additionally, the neural network apparatus may acquire the parameters from provided kernel, kernel element, and/or other connection weight vectors, matrix or matrices, or other format kernels, kernel elements, and/or other connection weights, representing some or all of the trained kernels and/or weighted connections of the trained neural network. The neural network apparatus may also be provided or made available the kernel, kernel element, and/or other connection weight vectors, matrix or matrices, or other format kernels, kernel elements, and/or connection weights, as a result of the example training of the neural network by the neural network apparatus or by another processing apparatus or server, for example. The neural network apparatus is representative of one or more processors and one or more non-transitory memories, for example, such as to store such parameters, for use during and after the convolutional and/or selective convolutional operations of the neural network, and for storing of instructions, which when executed by the one or more processors, cause the one or more processors to implement one or more or all operations described herein, for example.

The neural network includes a plurality of layers, and each of the layers includes a plurality of nodes. For example, there may be an input layer, at least one hidden layer, and an output layer. Depending on the architecture of the neural network, nodes included in neighboring layers may be selectively connected according to respective connections, e.g., which may or may not be weighted. For example, the neural network may be implemented by a processor, i.e., one or more processors, configured to generate a neural network structure/architecture with such a plurality of layers each including plural nodes and configured to apply such example weighted connections between neighboring nodes in neighboring layers of the neural network structure, and/or apply such example kernels or weighted connections within layers, to interpret input data applied to the neural network structure. As only examples, herein such an 'interpretation' of input data may include a performed filtering, detection, recognition, verification, or rejection, such as image recognition or verification, translation or rejection, or input data binary or multi-class classification, clustering, pattern observation, transformation, and/or regression, as well as any other trained objective of the neural network. Thus, as a non-limiting examples, in varying embodiments, the neural network may be trained for image or object detection, recognition, identification, rejection, or discrimination. Thus, based on the training data and desired interpretation objective, the architecture, selective connections between neighboring nodes and/or kernels, kernel elements, or other connections within layers may be varied during training by the neural network apparatus until the neural network is trained to a desired acceptability for the desired interpretation objective. For example, convolutional (or CNN) layers of the neural network may be trained for image or object filtering, detection, recognition, verification, or rejection, and thus the respective convolutional kernel elements, e.g., for varying feature extractions through feature kernels, may be trained to an original desired acceptability for the image or object filtering, detection, recognition, verification, or rejection operations. The neural network may also include a different type of neural network and merely include one or more convolutional layers, e.g., for selective feature extraction, for other objectives. Thus, herein, though embodiments may be discussed from the perspective of a neural network apparatus, such reference to CNNs is not intended to be limiting of the apparatus to only implementing CNNs. Returning to the training of the neural network, the resultant kernels, kernel elements, and/or other connection weights of the trained neuro network may be referred to as parameters of the neural network, e.g., demonstrated as at least trained kernel elements of a convolutional layer or operation of the CNN. For example, the neural network may be trained based on the labeled input image information or desired corresponding output images, filtering, classifications, or geometric parameters, such as through a backpropagation algorithms. In the training, example connection weightings between nodes of different hidden layers may be recursively adjusted until the corresponding neural network model is trained with a desired accuracy rate or below a maximum error rate, for example. Likewise, during the training, example kernels, kernel elements, or connection weightings between nodes within respective layers may be adjusted in the recursive adjusting. The respectively trained neuro network may be stored in a memory of the training and/or recognition apparatus, for example. In examples, the trained neural network may be stored in trained vectors, matrix or matrices, or other formats, e.g., where elements of the vectors, matrices, or other formats represent or suggest the corresponding trained parameters, e.g., trained kernels, kernel elements, and/or other weighted connections, of the corresponding neural network structure. As noted above, herein such trained kernels, or kernel elements, will be referred to as "original" weights. The stored trained neural network may further include hyper-parameter information, which may define the specific structure or architecture of the corresponding neural network for which the example stored trained parameters correspond to. The hyper-parameters may define the architecture or structure of the inputs and output layers as well as how many hidden layers there are and the function and structure/architecture of the respective hidden layers, such the respective arrangement and which are fully connected, recurrent, convolutional, de-convolutional, or pooling layers, as only examples. The hyper-parameters may further include information of the configuration and values of any bias and/or contextual nodes in the neural network, corresponding activation functions of the nodes, types of nodes, such as long short-term memory nodes, gated linear unit nodes, or merely nodes configured to perform a single activation function for a summation of inputs, and define any or any further recurrent structures of the neural network, which may vary depending on embodiment and interpretation objective of the trained neural network.

Thus, as illustrated, neural network 1 may be implemented as an architecture having a plurality of layers including an input image layer, feature map-generating layers, and an output layer. In the neural network 1, the input image may be convoluted with a filter including weights, and as a result, a plurality of feature maps (or activation maps or convolved features) may be output. The output feature maps may be again convoluted as input feature maps with corresponding filter weights, and a plurality of new feature maps may be output. After such convolution operations are repeatedly performed, the recognition results of features of the input image through the neural network 1 may be finally output.

For example, when an image of a 24×24 pixel size is input to the neural network 1 of FIG. 1, the input image may be output as feature maps of 4 channels each having a 20×20 size through a convolution operation with weights. Also, some of the pixel values of the feature maps of 4 channels each having the 20×20 size may be subject to a sub-sampling operation to output feature maps of 4 channels each having a 10×10 size. The sub-sampling operation may be max-pooling, average-pooling, etc.

Thereafter, the example 10×10 feature maps may be subject to a convolution operation and sub-sampling operation with weights so that the sizes of the 10×10 feature maps may be reduced, and, after further repeated convolutions and sub-samplings, finally, global features may be output. The neural network 1 may repeatedly perform convolution operations and sub-sampling (or pooling or down-sampling) operations through several layers to filter, from the input image, robust features (that is, global features) capable of representing the input image to output the global features, and may then input the global features to the fully connected layers, thereby finally deducing a recognition result of the input image.

Figure 2:
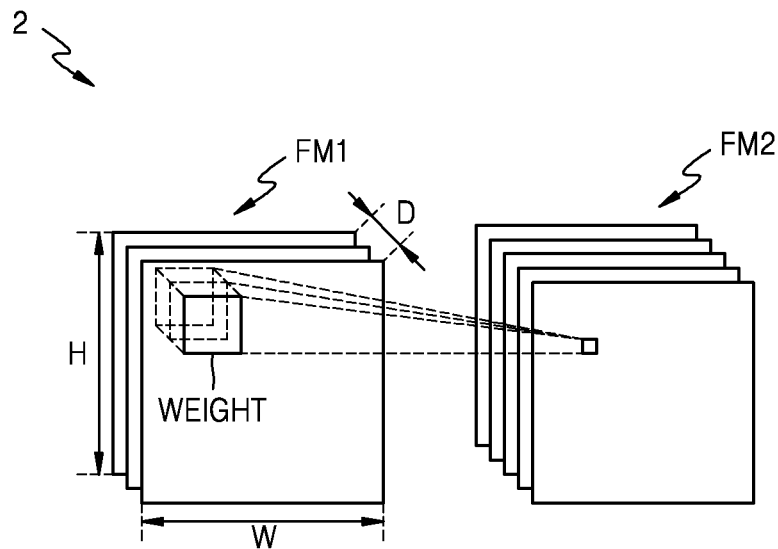
FIG. 2 illustrates a relation between an input feature map and an output feature map in a neural network according to one or more embodiments of the disclosure.

FIG. 2 illustrates a relation between an input feature map and an output feature map in a neural network according to one or more embodiments of the disclosure.

Referring to FIG. 2, with respect to a certain layer 2 of a neural network, a first feature map FM1 may correspond to an input feature map and a second feature map FM2 may correspond to an output feature map. For example, the first feature map FM1 may mean a data set representing various features of input data, and the second feature map FM2 may mean a data set representing various features of output data resulting from convolution operations being performed by applying the weight to the first feature map FM1. The first and second feature maps FM1 and FM2 may have elements of a 2-Dimensional (2D) matrix or elements of a 3-Dimensional (3D) matrix, wherein each element defines a pixel value. The first and second feature maps FM1 and FM2 may have a width (or called a column) W, a height (or called a row) H, and a depth D, wherein the depth D may correspond to the number of channels.

Thus, the first feature map FM1 may be convoluted with weights (e.g., a weight map) to generate the second feature map FM2. That is, the layer 2 may thus perform a convolution operation between the first feature map FM1 and weights of a kernel, and as a result, the second feature map FM2 may be generated. The weights may be defined for individual elements and convoluted with the first feature map FM1 to filter features of the first feature map FM1. The weights may be respectively convoluted with windows (or called tiles) of the first feature map FM1, while shifting on the first feature map FM1 by a sliding window method. During each shifting, pixel values included in the weights may be respectively multiplied by and added to pixel values of windows overlapping the weights in the first feature map FM1. A stride may correspond to the number of pixels by which the kernel slides between shifts. As the first feature map FM1 is convoluted with the weights, a channel of the second feature map FM1 may be generated. In FIG. 1, a single weight is shown. However, actually, a plurality of weights may be convoluted with the first feature map FM1 to generate the second feature map FM2 of a plurality of channels.

The second feature map FM2 may also thus correspond to an input feature map of the next layer. For example, the second feature map FM2 may become an input feature map of a subsequent pooling (or sub-sampling) layer.

In FIGS. 1 and 2, for convenience of description, a schematic architecture of the neural network 1 is shown. However, examples of the neural network 1 may include a larger or smaller number of layers, feature maps, weights, etc., than those shown in FIGS. 1 and 2, and examples exist with various sizes of the layers, feature maps, weights, etc., as will be understood after an understanding of the disclosure of this application.

Figure 3A:
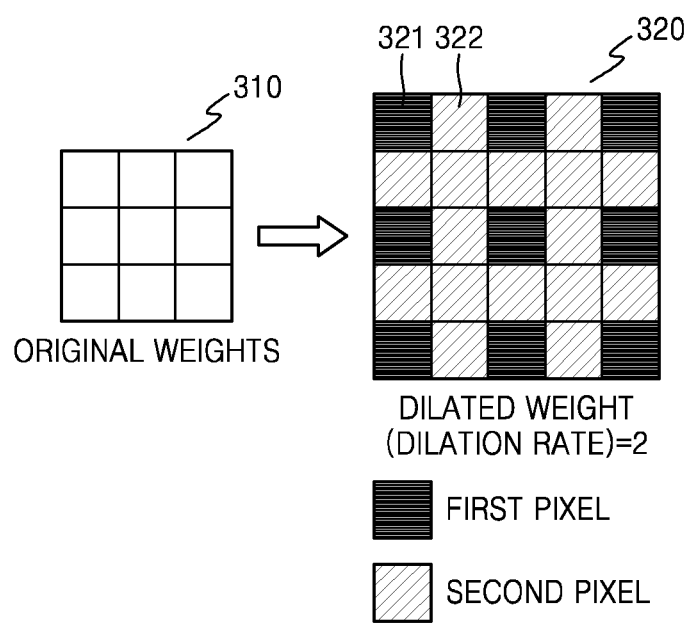
FIGS. 3A and 3B are example views illustrating a dilated convolution operation.
Figure 3B:
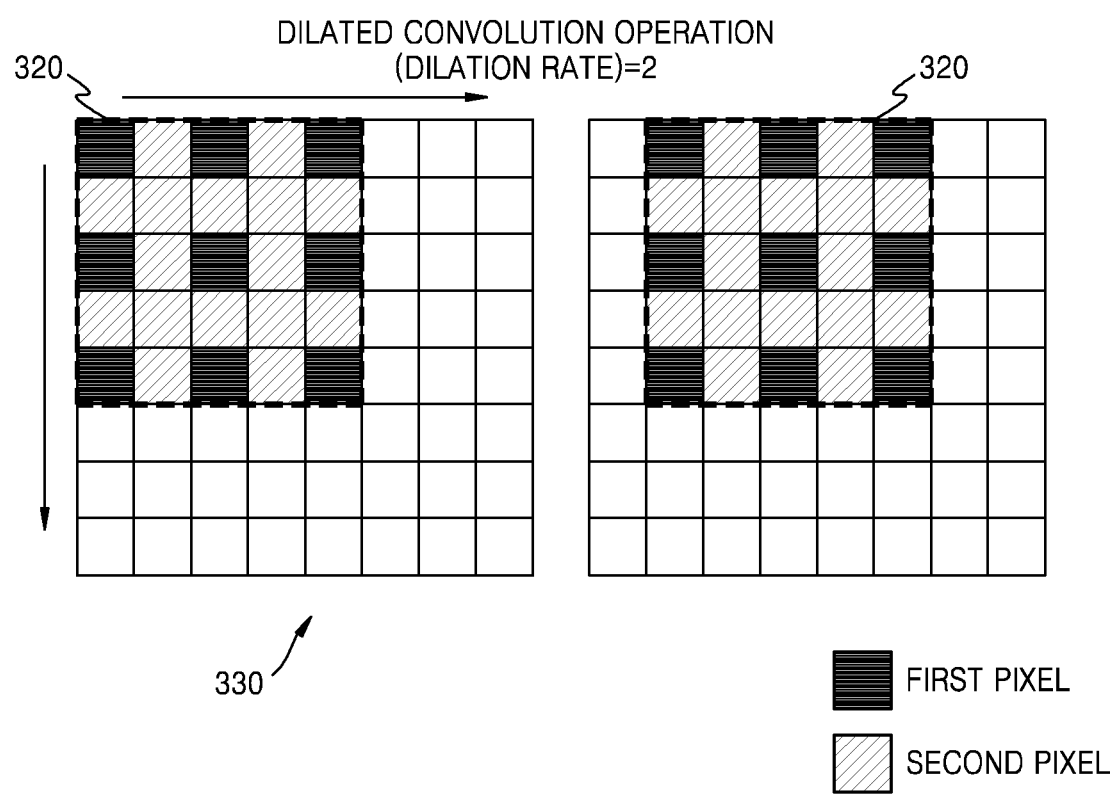

FIGS. 3A and 3B are example views illustrating a dilated convolution operation.

In FIG. 3A, original weights 310 (e.g., of an original kernel or filter) and dilated weights 320 (e.g., of a dilated kernel or filter) are shown. In an example, dilated weights are weights spaced apart from adjacent weights by a predetermined number of pixels. A typical convolution operation may be performed between an input feature map and the original weights 310, whereas a dilated convolution operation may be performed between an input feature map and the dilated weights 320.

A neural network apparatus of the present disclosure may perform a dilated convolution operation to dilate a size of a receptive field without loss of resolution. In an example, a receptive field may be a portion of the input feature map wherein a dilated convolution operation may be performed between the receptive field and the dilated weights 320 to generate a portion of an output feature map (e.g., one node or pixel in a feature map). Typically, to dilate a receptive field, it is necessary to increase the number of parameters (that is, weights). However, in an example of the present application, the dilated convolution operation may dilate a size of a receptive field without increasing the number of parameters. That is, a neural network apparatus may perform dilated convolution operations by dilating a size of a receptive field without increasing the number of parameters to thereby advantageously reduce an operation count.

According to an example, a neural network apparatus may determine a size of the dilated weights 320 based on a dilation rate. According to an example, a neural network apparatus may space neighboring pixels of the original weights 310 by 'dilation rate−1' to dilate the original weights 310 to the dilated weights 320. As used herein, a pixel of a weight may refer to a value of the weight (e.g., a weight of a weight map or a kernel value of a kernel map). Further, a pixel of a feature map may refer to a value of the feature map. For example, a 'dilation rate−1' corresponds to no pixel spacing between the original weights 310.

Referring to FIG. 3A, when the dilation rate is '2', a neural network apparatus may space neighboring pixels of the original weights 310 of a 3×3 size by '1' (e.g., by 1 pixel) to dilate the original weights 310 of the 3×3 size to the dilated weights 320 of a 5×5 size. Likewise, when the dilation rate is '3', a neural network apparatus may space neighboring pixels of the original weights 310 of the 3×3 size to dilated weights of a 7×7 size.

According to an example, values of pixels newly generated as the neighboring pixels of the original weights 310 are spaced in the dilated weights 320 may be set to a predetermined value. Referring to FIG. 3A, the dilated weights 320 may be configured with first pixels 321 and second pixels 322. The first pixels 321, which are pixels constructing the original weights 310, may be substantially meaningful pixels that are to be convoluted with an input feature map. The second pixels 322 may be pixels applied to dilate a size of a receptive field, and for example, the second pixels 322 may be set to a value of '0'.

FIG. 3B is a view for describing a method of performing a convolution operation, that is, a dilated convolution operation between the dilated weights 320 and an input feature map 330. The input feature map may be a feature map of an input image, for example.

The dilated weights 320 of the 5×5 size may be respectively convoluted with pixels of the input feature map 330 of an 8×8 size, while shifting on the input feature map 330 by the sliding window method, thereby generating an output feature map (e.g., generating an output feature map of a 4×4 size when a stride value is 1). During each shift, pixels of the dilated weights 320 may be respectively multiplied by and added to pixels overlapping the weights 320 in the input feature map 330, thereby being convoluted with the pixels of the input feature map 330, and thereby generating an output feature map. For example, each respective weight 320 may be multiplied by a pixel of the input feature map which the respective weight 320 overlaps, and these multiplication outputs may be added together to generate a first pixel value of an output feature map. Then, the dilated weights 320 may be shifted by a stride value (e.g., shifted over by 1 pixel) and the process may be repeated to generate a second pixel value of the output feature map.

Because the dilated weights 320 have a 5×5 size, the receptive field may also have a 5×5 size. However, because values of the second pixels among the pixels of the dilated weights 320 of the 5×5 size are set to '0', a substantial operation count of dilated convolutions may be equal to an operation count between the values of the first pixels and those of pixels overlapping the first pixels in the input feature map 330. That is, although the size of the dilated weights 320 is 5×5, an operation count of the dilated weights 320 may be equal to an operation count required for processing weights of a 3×3 size.

Figure 4:
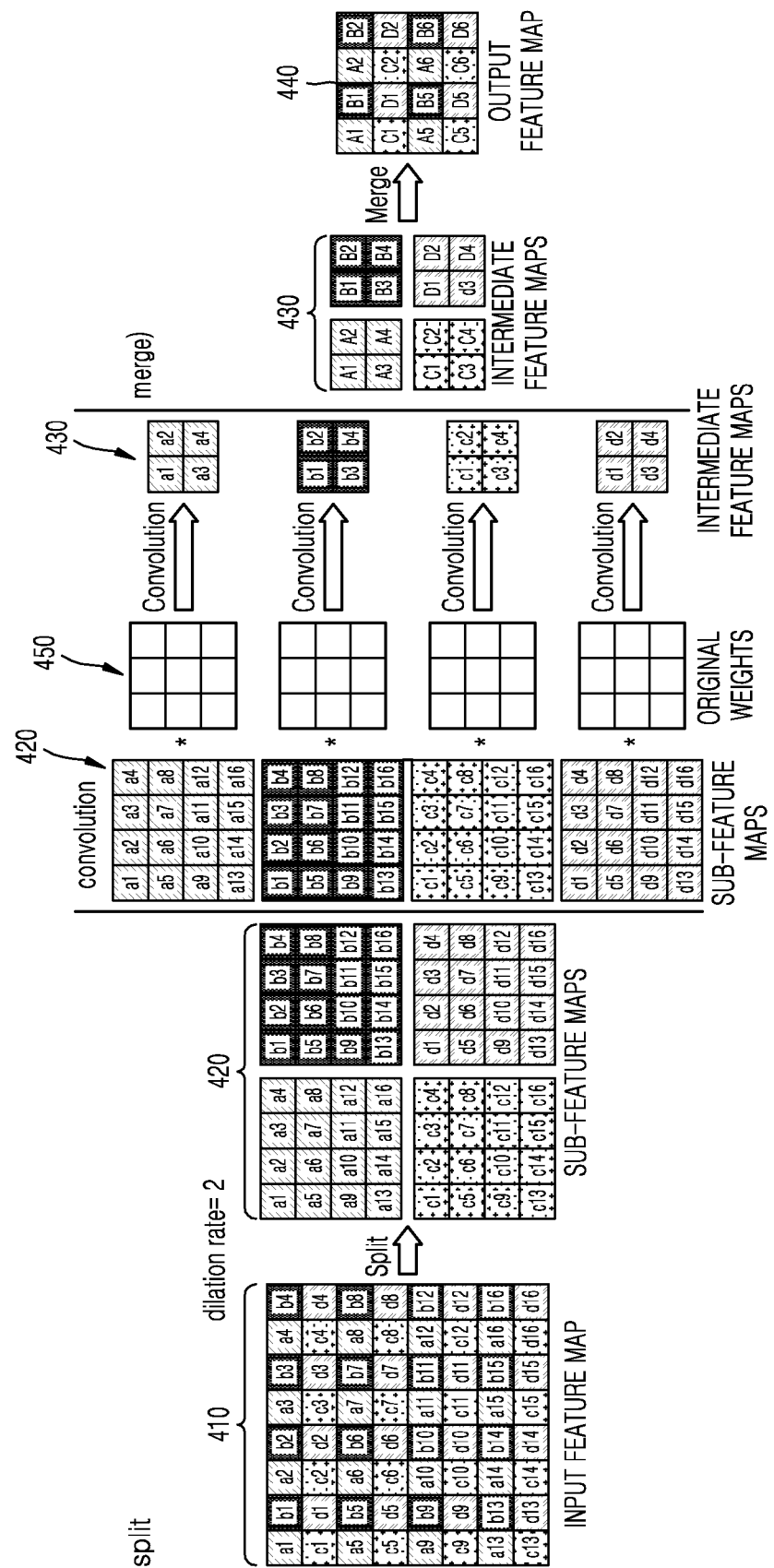
FIG. 4 illustrates examples of dilated convolution operations using a splitting and merging method according to one or more embodiments of the disclosure.

FIG. 4 illustrates examples of performing dilated convolution operations by using a splitting and merging method according to one or more embodiments of the disclosure.

The neural network apparatus may split an input feature map 410 into a plurality of sub-feature maps 420 based on a dilation rate.

According to an embodiment of the disclosure, the neural network apparatus may determine the number of sub-feature maps 420 that are to be split from the input feature map 410, based on a dilation rate. The neural network apparatus may split the input feature map 410 into sub-feature maps 420 by a dilation rate of '2'. Referring to FIG. 4, when a dilation rate is '2', the neural network apparatus may split the input feature map 410 of an 8×8 size into 4 sub-feature maps 420 each having a 4×4 size.

Also, the neural network apparatus may determine a method of splitting the input feature map 410, based on the dilation rate. The neural network apparatus may split the input feature map 420 such that pixels spaced by 'dilation rate−2' in the input feature map 410 are included in a same sub-feature map. That is, neighboring pixels of each of the plurality of sub-feature maps 420 may be pixels spaced by 'dilation rate−2' in the input feature map 410.

More specifically, referring to FIG. 4, when the dilation rate is '2', the neural network apparatus may split the input feature map 410 into the sub-feature maps 420 such that pixels spaced by dilation rate '2' in the input feature map 410 are included in a same sub-feature map 420. For example, pixels a1 to a16 spaced by dilation rate '2' among 64 pixels constructing the input feature map 410 of the 8×8 size may construct a sub-feature map. Likewise, pixels b1 to b16, pixels c1 to c16, and pixels d1 to d16 may construct different sub-feature maps.

The neural network apparatus may perform convolution operations between the plurality of sub-feature maps 420 and original weights 450 to generate a plurality of intermediate feature maps 430.

According to an embodiment of the disclosure, the neural network apparatus may perform convolution operations between the pixels of the plurality of sub-feature maps 420 and the original weights 450, while shifting the original weights 450 on each of the plurality of sub-feature maps 420 by the sliding window method. During each shifting, the convolution operations may be performed such that the pixels of the original weights 450 are respectively multiplied by and added to pixels overlapping the pixels of the original weights 450 in each of the plurality of sub-feature maps 420.

As the results of the convolution operations performed between the plurality of sub-feature maps 420 and the original weights 450, the plurality of intermediate feature maps 430 may be generated to respectively correspond to the plurality of sub-feature maps 420. That is, the number of sub-feature maps 420 may be identical to that of intermediate feature maps 430.

Referring to FIG. 4, the neural network apparatus may perform convolution operations between 4 sub-feature maps 420 each having a 4×4 size and original weights 450 having a 3×3 size to generate 4 intermediate feature maps 430 each having a 2×2 size.

The neural network apparatus may merge the plurality of intermediate feature maps 430 based on the dilation rate to generate an output feature map 440. According to an embodiment of the disclosure, the neural network apparatus may determine a method of merging the plurality of intermediate feature maps 430, based on the dilation rate. The neural network apparatus may merge the plurality of intermediate feature maps 430 such that neighboring pixels of each of the plurality of intermediate feature maps 430 are spaced by 'dilation rate−1' in the output feature map 440.

Referring to FIG. 4, when the dilation rate is '2', the neural network apparatus may merge the plurality of intermediate feature maps 430 such that neighboring pixels of each of the plurality of intermediate feature maps 430 are spaced apart by '1' pixel in the output feature map 440. The neural network apparatus may merge the 4 intermediate feature maps 430 each having a 2×2 size to generate an output feature map 440 of a 4×4 size. In an example, the splitting and merging method described above with respect to FIG. 4 may be an iteration, and the output feature map 440 of the iteration may be the input feature map 410 of a subsequent iteration of the splitting and merging method described above with respect to FIG. 4.

The typical method of performing the dilated convolution operations using the dilated weights 320, as described above with reference to FIGS. 3A and 3B, may be inefficient in that it may need to use the dilated weights dilated from original weights and may need to read (or process) pixels (that is, the second pixels 322, for example) not used for the convolution operations. For example, when a second pixel of the dilated weights are set to a value of '0', a multiplication output between the second pixel and a pixel of an input feature map which the second pixel overlaps is '0', and therefore performing this multiplication process is inefficient and unnecessary, as the '0' value does not add a value to the multiplication outputs added together to generate a first pixel value of an output feature map.

However, because an example of the present disclosure described above with respect to FIG. 4 applies a splitting and merging method to perform dilated convolution operations, the example of the present disclosure may improve computing speed and power efficiency in that it does not need to dilate the original weights 310 and 450 to the dilated weights 320 and it reads (or processes) pixels (that is, pixels of each of the plurality of sub-feature maps 420) of an input feature map substantially used for the convolution operations to perform the dilated convolution operations, e.g., without necessarily performing processes which do not contribute to the generation of an output feature map.

Further, an example of the present disclosure described above may be applied to an input feature map with multiple channels. For example, the splitting and merging method of FIG. 4 may be applied to each of a plurality of channels of the input feature map 410, thereby generating a plurality of respective output feature maps 440. Further, an example of the present disclosure described above may be applied to an original weight with multiple channels. For example, the splitting and merging method of FIG. 4 may be applied to the feature map 410 for each channel of the original weights 450, thereby generating a plurality of respective output feature maps 440. The plurality of output feature maps 440 may each be respectively used in further convolution operations and the outputs thereof may be used to perform respective functions such as differing object detection functions. In another example, the plurality of output feature maps 440 may be combined into a combined output feature map.

Figure 5:
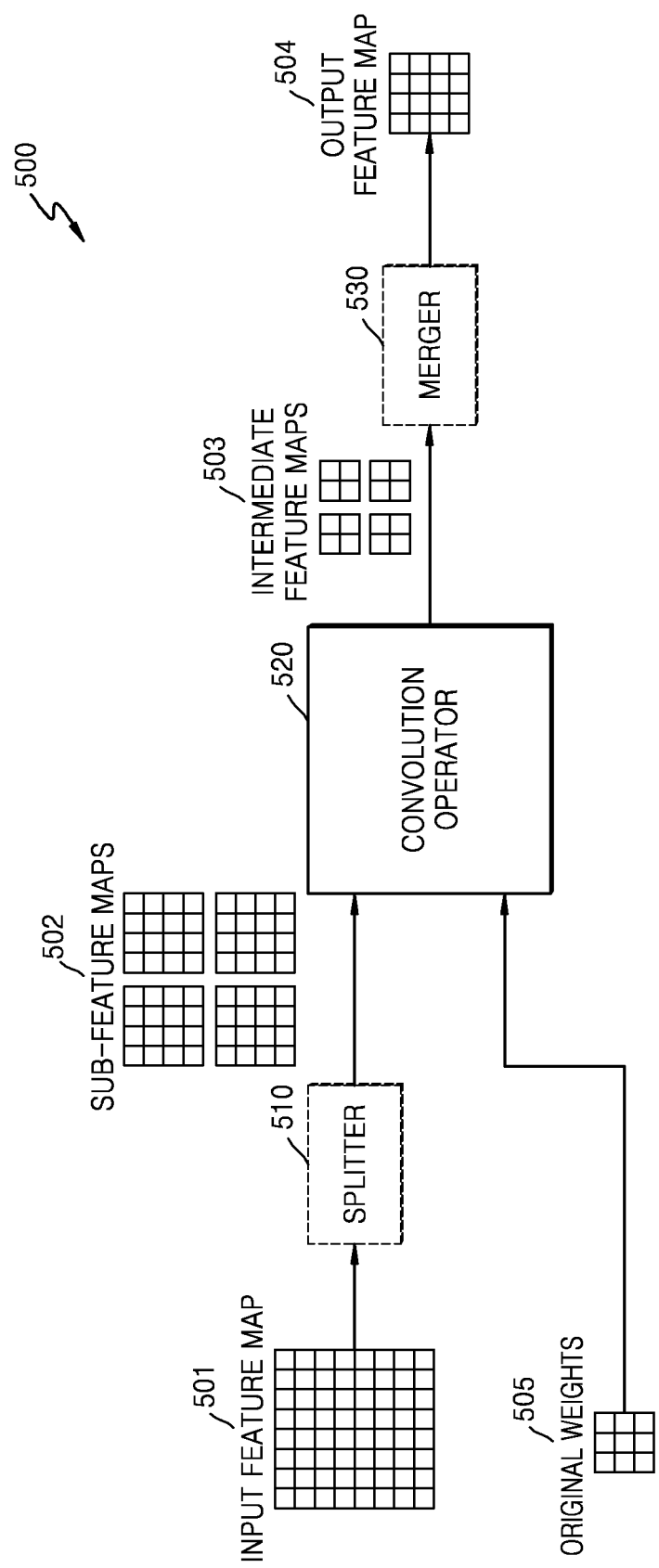
FIG. 5 illustrates performing dilated convolution operations using a splitter and a merger according to one or more embodiments of the disclosure.

FIG. 5 illustrates performing dilated convolution operations by using a splitter and a merger according to one or more embodiments of the disclosure.

Referring to FIG. 5, a neural network apparatus 500 may include a splitter 510, a convolution operator 520, and/or a merger 530. The splitter 510, the convolution operator 520, and/or the merger 530 may be implemented as one or more central processing units (CPUs), graphics processing unit (GPUs), application processor (APs), etc., included in the neural network apparatus 500, although not limited thereto.

The neural network apparatus 500 may acquire an input feature map 501 and original weights 505 from a memory.

The input feature map 501 may be input to the splitter 510. The splitter 510 may split the input feature map 501 into a plurality of sub-feature maps 502, based on a dilation rate. According to an embodiment of the disclosure, the splitter 510 may split the input feature map 501 into sub-feature maps 502 by a dilation rate of '2'. That is, the splitter 510 may split the input feature map 501 such that pixels spaced by 'dilation rate-2' in the input feature map 501 are included in a same sub-feature map.

The plurality of sub-feature maps 502 generated by the splitter 510 and the original weights 505 may be input to the convolution operator 520. The convolution operator 520 may perform convolution operations between the plurality of sub-feature maps 502 and the original weights 505. More specifically, the convolution operator 520 may perform convolution operations between the pixels of the plurality of sub-feature maps 502 and the original weights 505, while shifting the original weights 505 on each of the plurality of sub-feature maps 502 by the sliding window method. The convolution operator 520 may perform convolution operations between the plurality of sub-feature maps 503 and the original weights 450 to generate a plurality of intermediate feature maps 503 respectively corresponding to the plurality of sub-feature maps 502.

The plurality of intermediate feature maps 503 generated by the convolution operator 520 may be input to the merger 530. The merger 530 may merge the plurality of intermediate feature maps 503 based on the dilation rate to generate an output feature map 504. The merger 530 may merge the plurality of intermediate feature maps 503 such that neighboring pixels of each of the plurality of intermediate feature maps 503 are spaced by 'dilation rate−1' in the output feature map 504. In an example, the operations performed using the splitter and the merger described above with respect to FIG. 5 may be an iteration, and the output feature map 504 of the iteration may be the input feature map 501 of a subsequent iteration of the operations performed using the splitter and the merger described above with respect to FIG. 5.

Meanwhile, the neural network apparatus 500 may acquire dilated weights, instead of the original weights 505, from the memory. In this case, the neural network apparatus 500 may restore the dilated weights to the original weights 505 based on the dilation rate. Referring to FIG. 3A, the neural network apparatus 500 may remove the second pixels 322 of the dilated weights 320 to restore the dilated weights 320 to the original weights 310 (the original weights 505) configured with the first pixels 321. The neural network apparatus 500 may input the restored original weights 310 (the original weights 505) and the plurality of sub-feature maps 502 generated by the splitter 510 to the convolution operator 520.

When hardware used for a typical convolution operation is used to perform a dilated convolution operation, it may be inefficient because it is necessary to use the dilated weights 320 dilated from the original weights 310 and to read (or process) pixels (that is, the second pixels 322 of FIGS. 3A and 3B, for example) of an input feature map not used for the convolution operation.

However, because an example of the present disclosure described above with respect to FIG. 5 may use hardware including the splitter 510, the convolution operator 520, and the merger 530, as non-limiting examples, such hardware may improve computing speed and power efficiency, e.g., over such typical approaches, in that it does not need to dilate original weights to dilated weights and it reads (or processes) pixels (that is, pixels of each of the plurality of sub-feature maps 502) of an input feature map substantially used for dilated convolution operations to perform the dilated convolution operations, without necessarily performing processes which do not contribute to the generation of an output feature map.

Figure 6:
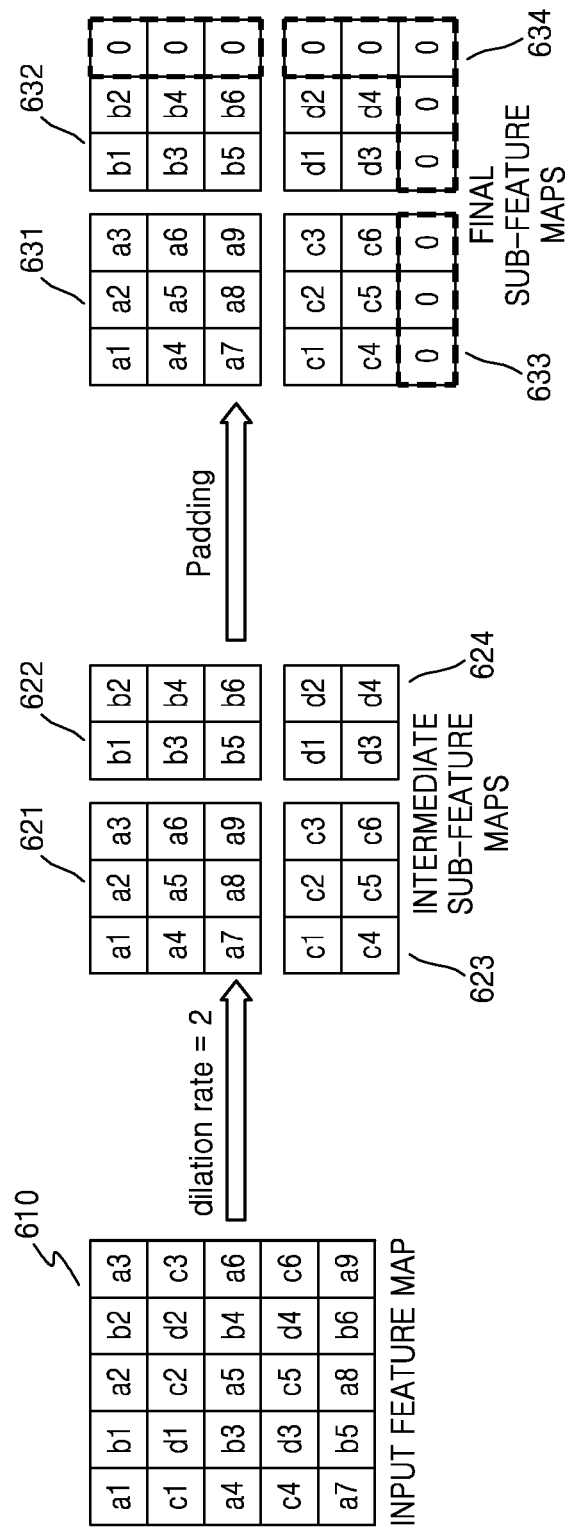
FIG. 6 illustrates a method of padding sub-feature maps, according to one or more embodiments of the disclosure.

FIG. 6 illustrates a method of padding sub-feature maps, according to one or more embodiments of the disclosure.

The neural network apparatus may split an input feature map 610 into a plurality of intermediate feature maps 621, 622, 623, and 624 based on a dilation rate. According to an embodiment of the disclosure, the neural network apparatus may split the input feature map 610 into intermediate sub-feature maps 621 to 624 by a dilation rate of '2'. That is, the neural network apparatus may split the input feature map 610 such that pixels spaced by 'dilation rate−2' in the input feature map 610 are included in a same intermediate sub-feature map.

Referring to FIG. 6, when the input feature map 610 has a 5×5 size and the dilation rate is '2', the input feature map 610 may be split into a first intermediate sub-feature map 621 of a 3×3 size, a second intermediate sub-feature map 622 of a 3×2 size, a third intermediate sub-feature map 623 of a 2×3 size, and a fourth intermediate sub-feature map 624 of a 2×2 size.

The neural network apparatus may compare sizes of the plurality of intermediate sub-feature maps 621 to 624 to a predetermined size, and when a size of at least one of the intermediate sub-feature maps 621 to 624 is smaller than the predetermined size, the neural network apparatus may pad at least one part of edges of the at least one intermediate sub-feature map with a predetermined value to generate a final sub-feature map of the predetermined size. According to an embodiment of the disclosure, the predetermined size may be a size of a largest one among the plurality of the intermediate sub-feature maps 621 to 624, although not limited thereto.

Referring to FIG. 6, the neural network apparatus may set the predetermined size to 3×3 (that is, a size of the first intermediate sub-feature map 621, for example), and pad edges of the second to fourth intermediate sub-feature maps 622 to 624 that are smaller than 3×3 with '0' to thereby generate a plurality of final sub-feature maps 631 to 634.

A first final sub-feature map 631 among the plurality of final sub-feature maps 631 to 634 may be identical to the first intermediate sub-feature map 621. Meanwhile, a third column of the second intermediate sub-feature map 622 may be padded with '0' to generate a second final sub-feature map 632, a third row of the third intermediate sub-feature map 623 may be padded with '0' to generate a third final sub-feature map 633, and a third column and a third row of the fourth intermediate sub-feature map 624 may be padded with '0' to generate a fourth final sub-feature map 634.

After the plurality of final sub-feature maps 631 to 634 are generated, the neural network apparatus may perform convolution operations between the plurality of final sub-feature maps 631 to 634 and original weights to generate intermediate feature maps. The next operations (such as generating an output feature map based on the intermediate feature maps) have been described in detail above with reference to FIGS. 4 and 5, and accordingly, further descriptions will be omitted for convenience of description.

Figure 7:
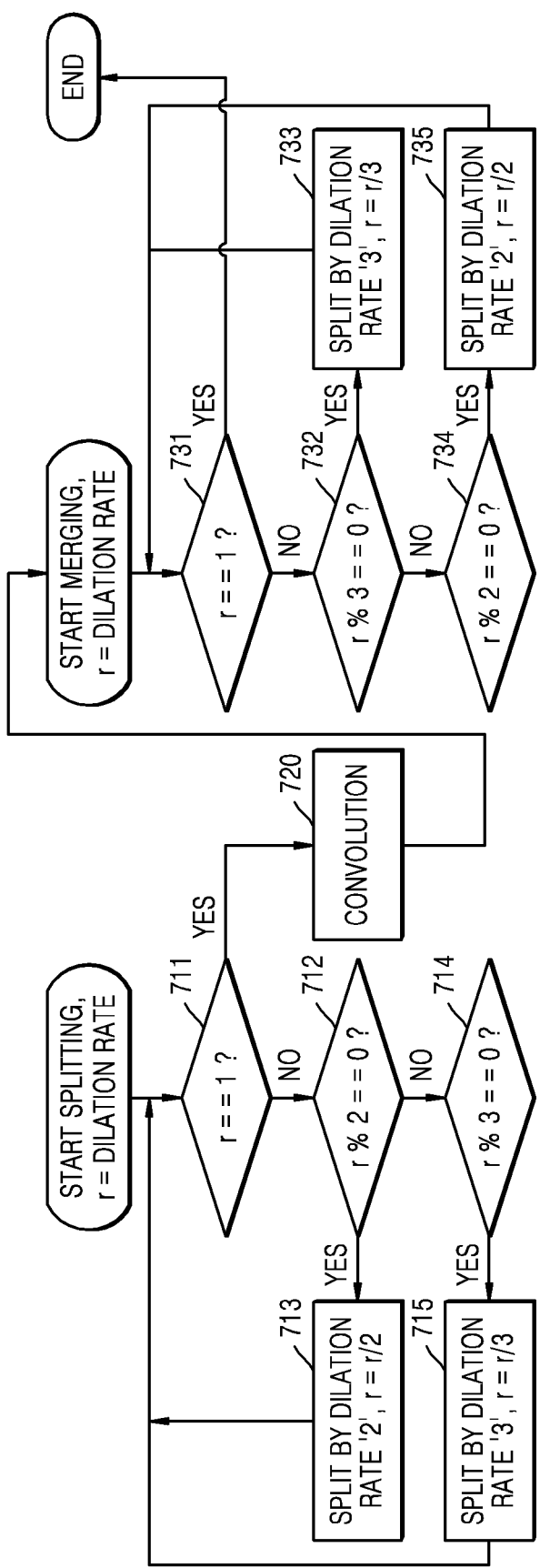
FIG. 7 illustrates a method of performing a dilated convolution operation considering computation performance of a splitter and a merger, according to one or more embodiments of the disclosure.

FIG. 7 illustrates a method of performing a dilated convolution operation considering computation performance of a splitter and a merger, according to one or more embodiments of the disclosure.

The splitter and the merger according to an embodiment of the disclosure may be configured to support a dilation rate (e.g., perform dilated convolution operations with the dilation rate) that is smaller than a predetermined threshold value. In this case, the neural network apparatus may use the splitter and the merger repeatedly to perform a dilated convolution with a dilation rate exceeding the threshold value, as will be described below with reference to FIG. 7.

Hereinafter, a method, performed by the neural network apparatus, of performing a dilated convolution with a dilation rate of '0' when the splitter and the merger in the neural network apparatus are configured to support a dilation rate of '2' and/or '3' (and/or multiples thereof) will be described. In an example, a dilated convolution with a dilation rate of '0' comprises performing a dilated convolution without needing to generate dilated weights (such as dilated weights 320 of FIGS. 3A and 3B) and apply the dilated weights to an input feature map (such as input feature map 330 of FIG. 3B).

First, the neural network apparatus may set a reference value (hereinafter, referred to as r). In an example, the reference value r may be initially set to equal a dilation rate.

Referring to FIG. 7, in operation 711, the neural network apparatus may determine whether r for performing a dilated convolution is '1' ("r==1 ?"). When r is not '1', the neural network apparatus may proceed to operation 712.

In operation 712, the neural network apparatus may determine whether r is a multiple of '2' ("r % 2==0 ?"). When r is a multiple of '2', the neural network apparatus may proceed to operation 713.

In operation 713, the neural network apparatus may set a dilation rate to '2', and then, split an input feature map into a plurality of sub-feature maps. When the dilation rate is '2', the input feature map may be split into 4 sub-feature maps. Also, the neural network apparatus may update r to r/2, and then return to operation 711 to determine whether r is '1'.

In operation 712, when r is not a multiple of '2', the neural network apparatus may proceed to operation 714.

In operation 714, the neural network apparatus may determine whether r is a multiple of '3' ("r % 3==0 ?"). When r is a multiple of '3', the neural network apparatus may proceed to operation 715.

In operation 715, the neural network apparatus may set the dilation rate to '3', and then split the input feature map into a plurality of sub-feature maps. When the dilation rate is '3', the input feature map may be split into 9 sub-feature maps. Also, the neural network apparatus may update r to r/3, and then return to operation 711 to determine whether r is '1'.

Meanwhile, operation 713 and/or operation 715 may be performed several times according to the dilation rate.

For example, when the dilation rate is '4' and r is initially set to '4', operation 713 may be performed twice. In this case, the neural network apparatus may split the input feature map into 4 first sub-feature maps and update r to '2 (=4/2)', in operation 713. Thereafter, the neural network apparatus may split each of the 4 first sub-feature maps into 4 second sub-feature maps and update r to '1 (=2/2)', in operation 713. That is, operation 713 may be performed twice, and as a result, a total of 16 second sub-feature maps may be generated. The 16 second sub-feature maps generated through the above-described process may be identical to 16 sub-feature maps generated by a splitter that supports a case in which a dilation rate is '4'.

Alternatively, when the dilation rate is '6' and r is initially set to '6', operation 713 may be performed and then operation 715 may be performed. In this case, the neural network apparatus may split an input feature map into 4 first sub-feature maps, and then update r to '3 (=6/2)', in operation 713. Thereafter, the neural network apparatus may split each of the 4 first sub-feature maps into 9 second sub-feature maps and update r to '1 (=3/3)', in operation 715. That is, operation 713 and operation 715 may be performed sequentially, and as a result, a total of 36 second sub-feature maps may be generated. The 36 second sub-feature maps generated through the above-described process may be identical to 36 sub-feature maps generated by a splitter that supports a case in which a dilation rate is '6'.

In operation 711, when r is '1', the neural network apparatus may proceed to operation 720. When operation 720 is performed, r may be reset to an initial value.

In operation 720, the neural network apparatus may perform convolution operations between the plurality of sub-feature maps and the original weights by using a convolution operator to generate a plurality of intermediate feature maps.

After the convolution operations are performed, the neural network apparatus may determine whether r for performing a dilated convolution is '1', in operation 731 ("r==1 ?"). When r is not '1', the neural network apparatus may proceed to operation 732.

In operation 732, the neural network apparatus may determine whether r is a multiple of '3' ("r % 3==0 ?"). When r is a multiple of '3', the neural network apparatus may proceed to operation 733.

In operation 733, the neural network apparatus may set the dilation rate to '3', and then merge the plurality of intermediate feature maps to an output feature map. Also, the neural network apparatus may update r to r/3, and then return to operation 731 to determine whether r is '1'.

In operation 732, when r is not a multiple of '3', the neural network apparatus may proceed to operation 734.

In operation 734, the neural network apparatus may determine whether r is a multiple of '2'("r % 2==0 ?"). When r is a multiple of '2', the neural network apparatus may proceed to operation 735.

In operation 735, the neural network apparatus may set the dilation rate to '2', and then merge the plurality of intermediate feature maps to an output feature map. Also, the neural network apparatus may update r to r/2, and then return to operation 731 to determine whether r is '1'.

Meanwhile, operation 733 and/or operation 735 may be performed several times according to the dilation rate.

For example, when the dilation rate is '4' and r is initially set to '4', operation 735 may be performed twice. In this case, the neural network apparatus may merge 16 first intermediate feature maps to generate 4 second intermediate feature maps, in operation 735, and update r to '2(=4/2)'. Then, the neural network apparatus may merge the 4 second intermediate feature maps to generate an output feature map, in operation 735, and update r to '1(=2/2)'. That is, operation 735 may be performed twice, and as a result, 16 first intermediate feature maps may be merged to generate an output feature map. The output feature map generated through the above-described process may be identical to an output feature map generated by a merger that supports a case in which a dilation rate is '4'.

When the dilation rate is '6' and r is initially set to '6', operation 733 may be performed, and then operation 735 may be performed. In this case, the neural network apparatus may merge 36 first intermediate feature maps to generate 4 second intermediate feature maps and update r to '2(=6/3)'. Thereafter, the neural network apparatus may merge 4 second sub-feature maps to generate an output feature map, in operation 735, and update r to '1(=2/2)'. That is, operation 733 and operation 735 may be performed sequentially, and as a result, 36 first intermediate feature maps may be merged to generate an output feature map. The output feature map generated through the above-described process may be identical to an output feature map generated by a merger that supports a case in which a dilation rate is '6'.

In operation 731, when r is '1', the neural network apparatus may terminate the merging operation and output the output feature map as a result value.

Meanwhile, FIG. 7 shows a case in which the splitter and the merger support a dilation rate of '2' and/or '3' (and/or multiples thereof), however, a kind and number of a dilation rate that the splitter and the merger support are not limited to these.

Figure 8A:
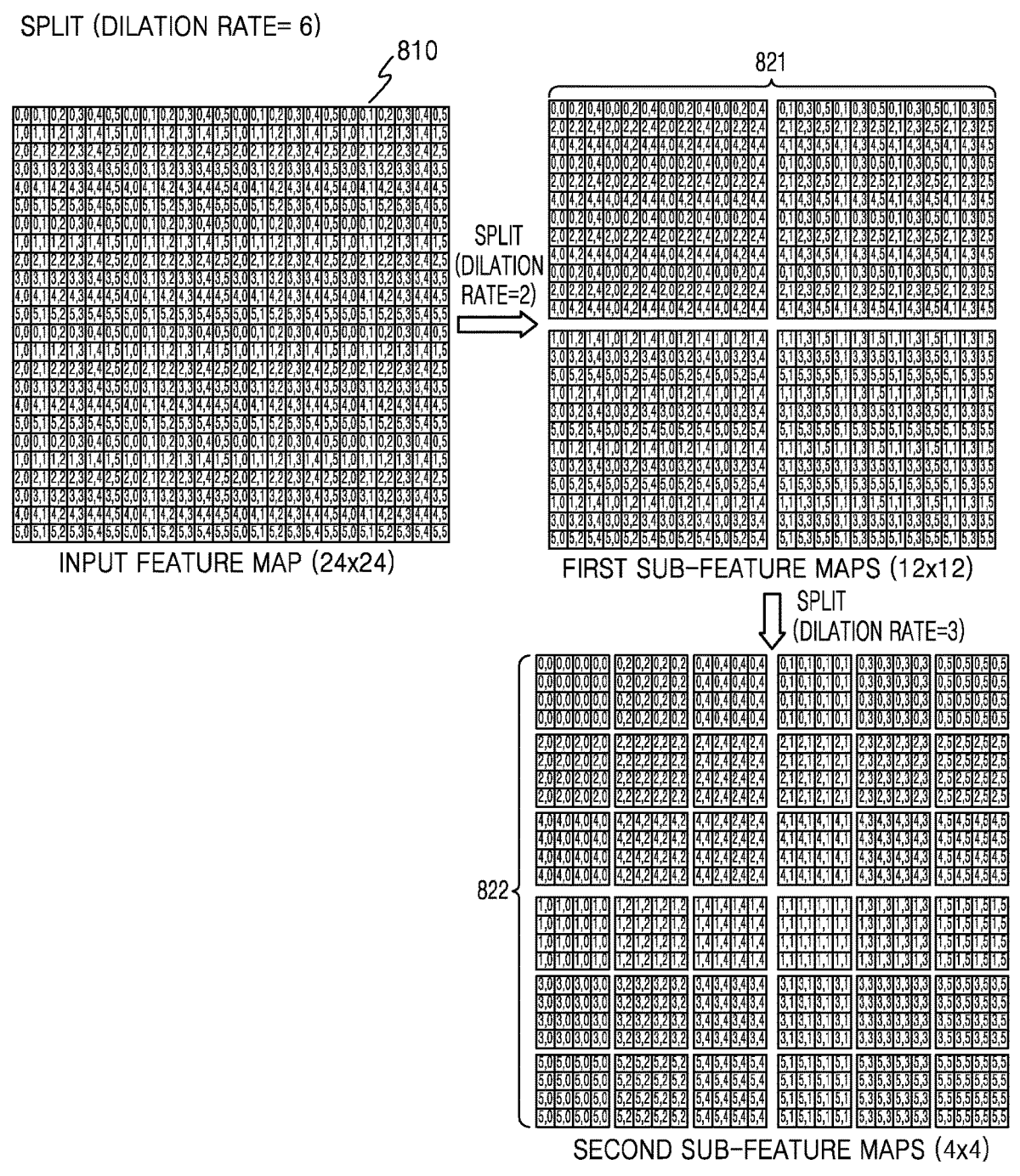

FIGS. 8A and 8B illustrate methods of performing dilated convolution operations considering computation performance of a splitter and a merger, according to one or more embodiments of the disclosure.

Hereinafter, a method, performed by the neural network apparatus, of performing a dilated convolution when the neural network apparatus is configured to support a dilation rate of '2' and/or '3' (and/or multiples thereof) will be described.

Referring to FIG. 8A, when a dilation rate is '6', an input feature map 810 of a 24×24 size may be split into a plurality of sub-feature maps. First, the neural network apparatus may set a reference value (hereinafter, referred to as r) to '6' (e.g., may set the reference value to equal the dilation rate).

The neural network apparatus may then set the dilation rate to '2', because r is a multiple of '2', and split the input feature map 810 of the 24×24 size into 4 (=22) first sub-feature maps 821 each having a 12×12 size. Because the dilation rate is set to '2', the neural network apparatus may split the input feature map 810 such that pixels spaced apart by '1' pixel in the input feature map 810 are included in a same first sub-feature map. After the neural network apparatus generates the first sub-feature maps 821, the neural network apparatus may update r to '3 (=r/2)'.

Then, because the updated r is a multiple of '3', the neural network apparatus may set the dilation rate to '3' and split each of the 4 first sub-feature maps 821 each having the 12×12 size into 9 second sub-feature maps 822 each having a 4×4 size. Because the dilation rate is set to '3', the neural network apparatus may split the first sub-feature maps 821 such that pixels spaced apart by '2' pixels in each first sub-feature map 821 are included in a second sub-feature map. After the neural network apparatus generates the second sub-feature maps 822, the neural network apparatus may update r to '1 (=dilation rate/3)'.

The 36 second sub-feature maps 822 each having a 4×4 size, generated through the above-described process, may be identical to 36 sub-feature maps each having a 4×4 size generated by a neural network apparatus that supports a case in which a dilation rate is '6'.

Referring to FIG. 8B, the neural network apparatus may perform convolution operations between the 36 second sub-feature maps each having a 4×4 size and original weights each having a 3×3 size to generate 36 first intermediate feature maps 831 each having a 2×2 size.

The neural network apparatus may again reset r to '6'. Also, the neural network apparatus may perform a merging process in reverse order of the splitting process described above.

The neural network apparatus may set the dilation rate to '3' because r is a multiple of '3'. The neural network apparatus may merge the 36 first intermediate feature maps 831 each having a 2×2 size to generate 4 second intermediate feature maps 832 each having a 6×6 size. Because the dilation rate is set to '3', the neural network apparatus may merge the first intermediate feature maps 831 such that neighboring pixels of each first intermediate feature map 831 are spaced apart by '2' pixels in the corresponding second intermediate feature map 832. After the neural network apparatus generates the second intermediate feature maps 832, the neural network apparatus may update r to '2 (=dilation rate/3)'.

Then, because the updated r is a multiple of '2', the neural network apparatus may set the dilation rate to '2' and merge the 4 second intermediate feature maps 832 each having a 6×6 size to generate an output feature map 840 of a 12×12 size. Because the dilation rate is set to '2', the neural network apparatus may merge the second intermediate feature maps 832 such that neighboring pixels of each second intermediate feature map 832 are spaced apart by '1' pixel in the output feature map 840. After the neural network apparatus generates the output feature map 840, the neural network apparatus may update r to '1 (=dilation rate/2)'.

The output feature map 840 of the 12×12 size, generated by the above-described process, may be identical to an output feature map of a 12×12 size, generated by a neural network apparatus that supports a case in which r is '6'.

Figure 9:
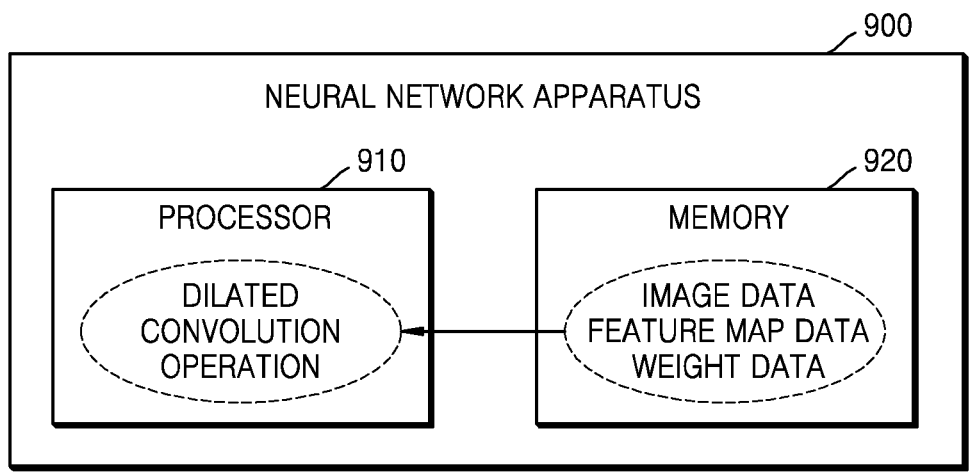
FIG. 9 illustrates a hardware configuration of a neural network apparatus according to one or more embodiments of the disclosure.

FIG. 9 illustrates a hardware configuration of a neural network apparatus according to one or more embodiments of the disclosure.

A neural network apparatus 900 may be implemented as various kinds of devices, such as a personal computer (PC), a server, a mobile device, an embedded device, etc., and as detailed examples, the neural network apparatus 900 may be a smart phone, a tablet device, an Augmented Reality (AR) device, an Internet of Things (IoT) device, an autonomous driving vehicle, robotics, medical equipment, etc., which perform voice recognition, image recognition, image classification, etc. through a neural network, although not limited thereto. Furthermore, the neural network apparatus 900 may be a dedicated hardware accelerator mounted in the above-mentioned devices, and the neural network apparatus 900 may be a hardware accelerator, such as a neural processing unit (NPU), a tensor processing unit (TPU), a neural engine, etc., which is a dedicated module for driving a neural network, although not limited thereto.

Referring to FIG. 9, the neural network apparatus 900 may include a processor 910 and a memory 920. In the neural network apparatus 900 shown in FIG. 9, components related to the current embodiments are shown. Accordingly, it will be apparent after an understanding of this disclosure that the neural network apparatus 900 may further include other components in addition to the components shown in FIG. 9. For example, the neural network apparatus 900 may include one or more image sensors configured to obtain input image data from which the processor 910 may generate an input feature map.

The processor 910 may control all functions for executing the neural network apparatus 900. For example, the processor 910 may execute programs stored in the memory 920 of the neural network apparatus 900 to thereby control all operations of the neural network apparatus 900. The processor 910 may be a CPU, a GPU, an AP, etc. included in the neural network apparatus 900, although not limited thereto.

The memory 920 may be hardware storing various data processed in the neural network apparatus 900, and for example, the memory 920 may store data processed in the neural network apparatus 900 and data that is to be processed in the neural network apparatus 900. Also, the memory 920 may store applications, drivers, etc. that are to be driven by the neural network apparatus 900. The memory 920 may include random access memory (RAM) (for example, dynamic random access memory (DRAM) or static random access memory (SRAM)), read-only memory (ROM), electrically erasable programmable read-only memory (EEPROM), CD-ROM, Blue-ray or another optical disk storage, hard disk drive (HDD), solid state drive (SSD), or a flash memory.

The processor 910 may read/write neural network data, for example, image data, feature map data, weight data, etc., from/in the memory 920, and execute the neural network using the read/written data. When the neural network is executed, the processor 910 may repeatedly perform convolution operations between an input feature map and weights to generate data for an output feature map. The processors 910 may perform image recognition for an input image based on the output feature map. An operation count of the convolution operations may be decided depending on various factors, such as the number of channels of the input feature map, the number of channels of the weights, a size of the input feature map, a size of the weights, precisions of values, etc. Unlike a typical neural network, a neural network that is driven on, or implemented by, the neural network apparatus 900 of the present application may be efficiently implemented with a more complicated architecture. Accordingly, the processor 910 may perform convolution operations by a great operation count that may reach hundreds of millions to tens of billions of convolution operations, so that the frequency of access to the memory 920 by the processor 910 for the convolution operations may also increase rapidly. Due to such a computational load, a typical mobile device, such as a smart phone, a tablet device, a wearable device, etc., having relatively low processing performance, an embedded device, etc. may not smoothly perform processing of the neural network.

Meanwhile, in the neural network, the weights may be floating point-type weights, fixed point-type weights, binary weights, or ternary weights. That is, in the neural network, the weights may be defined variously considering various factors, such as the purpose of use of the neural network, device performance, etc.

The processor 910 may drive a dilated convolution network. The processor 910 may include a splitter, a convolution operator, and a merger. The splitter may split an input feature map into a plurality of sub-feature maps based on a dilation rate. The convolution operator may perform convolution operations between the plurality of sub-feature maps and original weights to generate a plurality of intermediate feature maps. The merger may merge the plurality of intermediate feature maps based on the dilation rate to thereby generate an output feature map.

Figure 10:
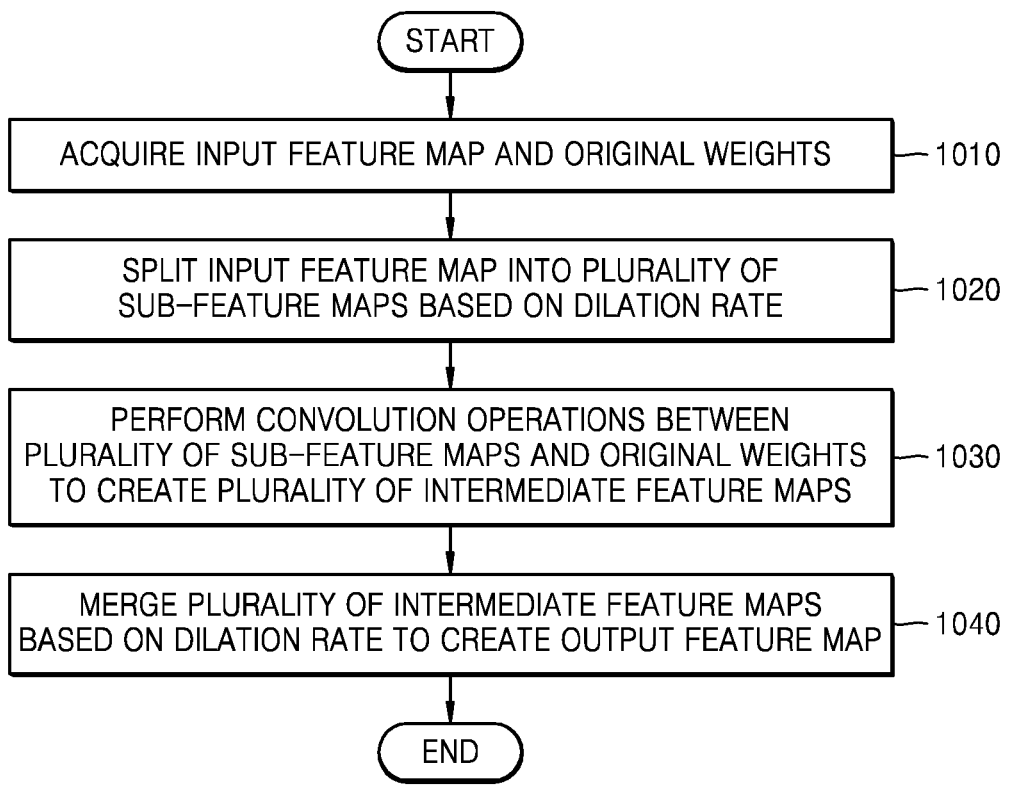
FIG. 10 illustrates a method of performing a dilated convolution operation in a neural network apparatus, according to one or more embodiments of the disclosure.

FIG. 10 illustrates a method of performing a dilated convolution operation in a neural network apparatus, according to one or more embodiments of the disclosure.

Because the method of performing a dilated convolution operation in the neural network apparatus, as shown in FIG. 10, relates to the embodiments described above with reference to the drawings, descriptions given above with reference to the drawings will also be applied to the method of FIG. 10.

Referring to FIG. 10, the neural network apparatus may acquire an input feature map and original weights, in operation 1010.

The neural network apparatus may acquire the input feature map and the original weights from a memory or the outside.

According to an embodiment of the disclosure, the neural network apparatus may acquire dilated weights instead of original weights. In this case, the neural network apparatus may restore the dilated weights to original weights based on a dilation rate.

The neural network apparatus may split the input feature map into a plurality of sub-feature maps, based on a dilation rate, in operation 1020.

Neighboring pixels of each sub-feature map may be pixels spaced by 'dilation rate−1' in the input feature map.

According to an embodiment of the disclosure, the neural network apparatus may compare a size of each sub-feature map with a predetermined size. When a size of at least one sub-feature map is smaller than the predetermined size, the neural network apparatus may pad at least one part of edges of the at least one sub-feature map with a predetermined value such that the size of the at least one sub-feature map becomes the predetermined size.

Meanwhile, operation 1020 may be performed by the splitter included in the neural network apparatus.

The neural network apparatus may perform convolution operations between the plurality of sub-feature maps and the original weights to generate a plurality of intermediate feature maps, in operation 1030.

Then, the neural network apparatus may merge the plurality of intermediate feature maps based on the dilation rate to generate an output feature map, in operation 1040.

Neighboring pixels of each intermediate feature map may be pixels spaced by 'dilation rate−1' in the output feature map.

Meanwhile, operation 1040 may be performed by the merger included in the neural network apparatus.

According to the embodiments of the disclosure, by performing dilated convolutions by using hardware including the splitter, the convolution operator, and the merger, computing speed and power efficiency may be improved.

The neural network apparatuses, neural network apparatus 900, processors, processor 910, memories, memory 920, splitters, splitter 510, convolutional operators, convolution operator 520, mergers, merger 530, and other apparatuses, devices, modules, and other components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A neural network apparatus, comprising:
one or more processors configured to:
acquire an input feature map and trained weights,
generate a plurality of sub-feature maps by splitting the input feature map based on a dilation rate,
generate a plurality of intermediate feature maps by performing a convolution operation between the plurality of sub-feature maps and the trained weights, and
generate a dilated output feature map by merging the plurality of intermediate feature maps based on the dilation rate,
wherein, for the generating of the sub-feature maps, the one or more processors are configured to:
compare a size of each of the plurality of sub-feature maps with a predetermined size, and
in response to a size of at least one sub-feature map of the plurality of sub-feature maps being smaller than the predetermined size, pad at least one part of edges of the at least one sub-feature map with a predetermined value such that the size of the at least one sub-feature map becomes the predetermined size.

2. The apparatus of claim 1, wherein neighboring pixels of each of the plurality of sub-feature maps are pixels differently spaced, with respect to the input feature map, by a number resulting from subtracting 1 from the dilation rate.

3. The apparatus of claim 1, wherein, each of the plurality of sub-feature maps includes pixels from the input feature map separated in the input feature map according to the dilation rate.

4. The apparatus of claim 1, wherein, for the padding of the at least one part of edges of the at least one sub-feature map, the one or more processors are configured to add either one or both of a row or column of pixels of the predetermined value to the at least one sub-feature map.

5. The apparatus of claim 1, wherein neighboring pixels of each of the plurality of intermediate feature maps are pixels spaced by a number resulting from subtracting 1 from the dilation rate in the output feature map.

6. The apparatus of claim 1, wherein the one or more processors comprise:
a splitter configured to perform the splitting of the input feature map into the plurality of sub-feature maps based on the dilation rate, and
a merger configured to perform the merging of the plurality of intermediate feature maps based on the dilation rate to generate the output feature map.

7. The apparatus of claim 6, wherein, for the generating of the sub-feature maps, the one or more processors are configured to:
compare the dilation rate with a threshold value, and
in response to the dilation rate exceeding the threshold value, update the dilation rate by dividing the dilation rate by another predetermined value, and split the input feature map into the plurality of sub-feature maps based on the other predetermined value.

8. The apparatus of claim 7,
wherein the sub-feature maps are first sub-feature maps, and
wherein the one or more processors are configured to:
compare the updated dilation rate with the threshold value, and
in response to the updated dilation rate exceeding the threshold value, update the updated dilation rate by dividing the updated dilation rate by the other predetermined value, and split the plurality of first sub-feature maps into a plurality of second-sub feature maps based on the other predetermined value.

9. The apparatus of claim 6, wherein, for the generating of the sub-feature maps, the one or more processors are configured to:
compare the dilation rate with a threshold value, and
in response to the dilation rate exceeding the threshold value, update the dilation rate by dividing the dilation rate by a predetermined value, and merge the plurality of intermediate feature maps based on the predetermined value to generate the output feature map.

10. The apparatus of claim 1, wherein the one or more processors comprise a convolution operator configured to perform the convolution operation between the plurality of sub-feature maps and the trained weights.

11. The apparatus of claim 1, wherein the one or more processors are configured to acquire a dilated weight from a memory and restore the dilated weight to the trained weights based on the dilation rate.

12. The apparatus of claim 1, wherein:
the input feature map corresponds to an input image, and
the one or more processors are configured to perform an image recognition for the input image based on the output feature map.

13. A processor-implemented neural network method, the method comprising:
acquiring an input feature map and trained weights;
generate a plurality of sub-feature maps by splitting the input feature map based on a dilation rate;
generate a plurality of intermediate feature maps by performing a convolution operation between the plurality of sub-feature maps and the trained weights; and
generate a dilated output feature map by merging the plurality of intermediate feature maps based on the dilation rate,
wherein the generating of the plurality of sub-feature maps further comprises:
comparing a size of each of the plurality of sub-feature maps with a predetermined size; and
in response to a size of at least one sub-feature map of the plurality of sub-feature maps being smaller than the predetermined size, padding at least one part of edges of the at least one sub-feature map with a predetermined value such that the size of the at least one sub-feature map becomes the predetermined size.

14. The method of claim 13, wherein neighboring pixels of each of the plurality of sub-feature maps are pixels spaced by a number resulting from subtracting 1 from the dilation rate in the input feature map.

15. The method of claim 13, wherein neighboring pixels of each of the plurality of intermediate feature maps are pixels spaced by a number resulting from subtracting 1 from the dilation rate in the output feature map.

16. The method of claim 13, wherein the generating of the plurality of sub-feature maps comprises:
comparing the dilation rate with a threshold value; and
in response to the dilation rate exceeding the threshold value, updating the dilation rate by dividing the dilation rate by another predetermined value, and splitting the input feature map into the plurality of sub-feature maps based on the other predetermined value.

17. The method of claim 13, wherein the generating of the plurality of sub-feature maps comprises:
comparing the dilation rate with a threshold value, and
in response to the dilation rate exceeding the threshold value, updating the dilation rate by dividing the dilation rate by another predetermined value, and merging the plurality of intermediate feature maps based on the other predetermined value to generate the output feature map.

18. The method of claim 13, wherein the acquiring of the input feature map and the trained weights comprises:
acquiring the input feature map and a dilated weight from a memory;
restoring the dilated weight to the trained weights based on the dilation rate.

19. A non-transitory computer-readable storage medium storing instructions that, when executed by one or more processors, cause the one or more processors to perform the method of claim 13.

* * * * *